(12) United States Patent
Peng et al.

(10) Patent No.: US 12,546,817 B2
(45) Date of Patent: Feb. 10, 2026

(54) CONNECTOR FOR CIRCUIT TESTING

(71) Applicant: F TIME TECHNOLOGY INDUSTRIAL CO., LTD., New Taipei (TW)

(72) Inventors: Chang-Lin Peng, New Taipei (TW); Chih-Min Peng, New Taipei (TW); Yu-Han Huang, New Taipei (TW)

(73) Assignee: F TIME TECHNOLOGY INDUSTRIAL CO., LTD., New Taipei (TW)

( * ) Notice: Subject to any disclaimer, the term of this patent is extended or adjusted under 35 U.S.C. 154(b) by 175 days.

(21) Appl. No.: 18/638,164

(22) Filed: Apr. 17, 2024

(65) Prior Publication Data
US 2025/0327857 A1    Oct. 23, 2025

(51) Int. Cl.
*G01R 31/28* (2006.01)

(52) U.S. Cl.
CPC ................. *G01R 31/2884* (2013.01)

(58) Field of Classification Search
CPC .................................. G01R 31/2884
USPC ..................... 324/762.01, 537, 500
See application file for complete search history.

(56) References Cited

U.S. PATENT DOCUMENTS

| | | | |
|---|---|---|---|
| 9,997,423 B2 * | 6/2018 | Killingsworth | G01R 31/26 |
| 11,307,221 B2 | 4/2022 | Vettori | |
| 2008/0303138 A1 * | 12/2008 | Flett | H01L 25/071 |
| | | | 257/E23.098 |
| 2019/0250188 A1 * | 8/2019 | Caudle | G01R 31/2601 |

FOREIGN PATENT DOCUMENTS

| | | |
|---|---|---|
| CN | 110488177 A | 11/2019 |
| CN | 214899170 U | 11/2021 |
| CN | 217901917 U | 11/2022 |
| CN | 217956210 U | 12/2022 |
| CN | 219266346 U | 6/2023 |
| CN | 219590392 U | 8/2023 |
| JP | 5134864 B2 | 1/2013 |
| TW | I747693 B | 11/2021 |

* cited by examiner

*Primary Examiner* — Giovanni Astacio-Oquendo (57) ABSTRACT

A connector for circuit testing includes a mounting seat, an extending seat, a fixing panel, and at least one central pin module. A rear end portion of the extending seat is mounted in a connecting hole of the mounting seat. At least one positioning ring is mounted around the rear end portion and is held between the extending seat and an inner sidewall that is defined around the connecting hole. Each of the at least one central pin module has a rear end held on the fixing panel and is mounted in the extending seat. The fixing panel is locked to a rear side surface of the mounting seat with multiple first fasteners. A whole of the connector can be locked to a fixing jig at once, which is simple and fast to assemble, without causing the at least one positioning ring to wear out.

12 Claims, 13 Drawing Sheets

CONNECTOR FOR CIRCUIT TESTING

BACKGROUND OF THE INVENTION

1. Field of the Invention

The present invention relates to a connector for circuit testing, especially to a connector for connecting a circuit tester and an electronic product to be tested.

2. Description of the Prior Art(s)

After being manufactured, electronic products need to be tested with a circuit tester to confirm whether circuit signals of the electronic products to be tested is able to operate properly.

Figure 10:
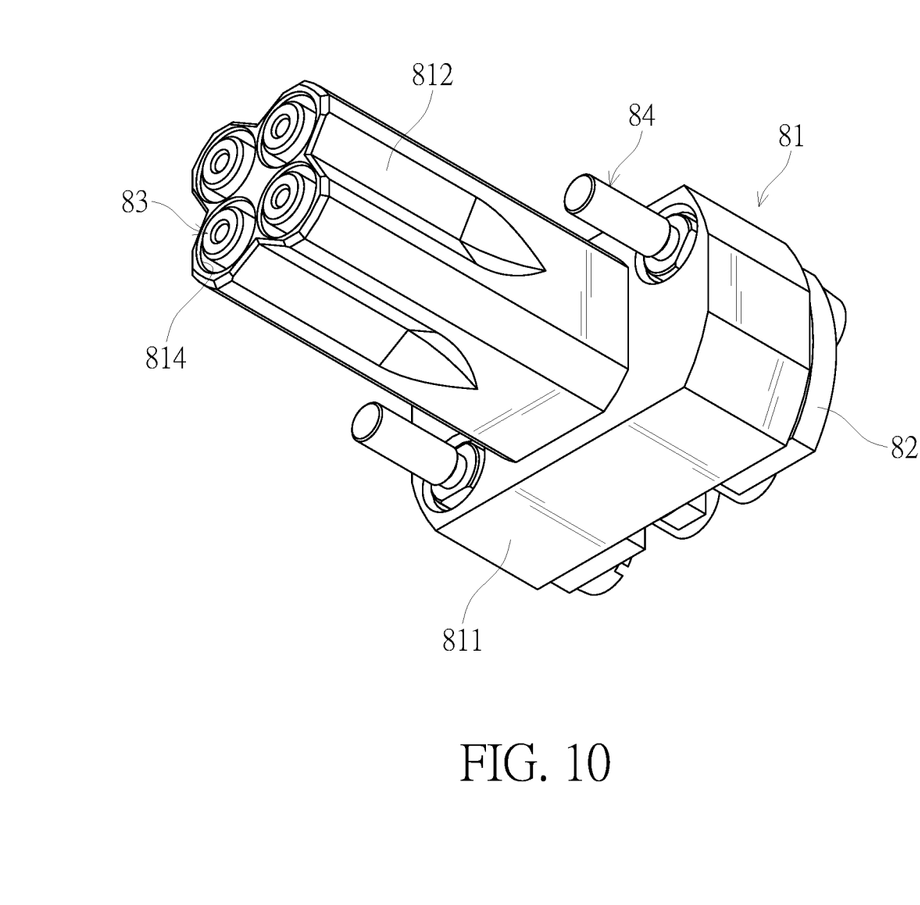
FIG. 10 is a perspective view of a conventional connector for circuit testing in accordance with the prior art.
Figure 11:
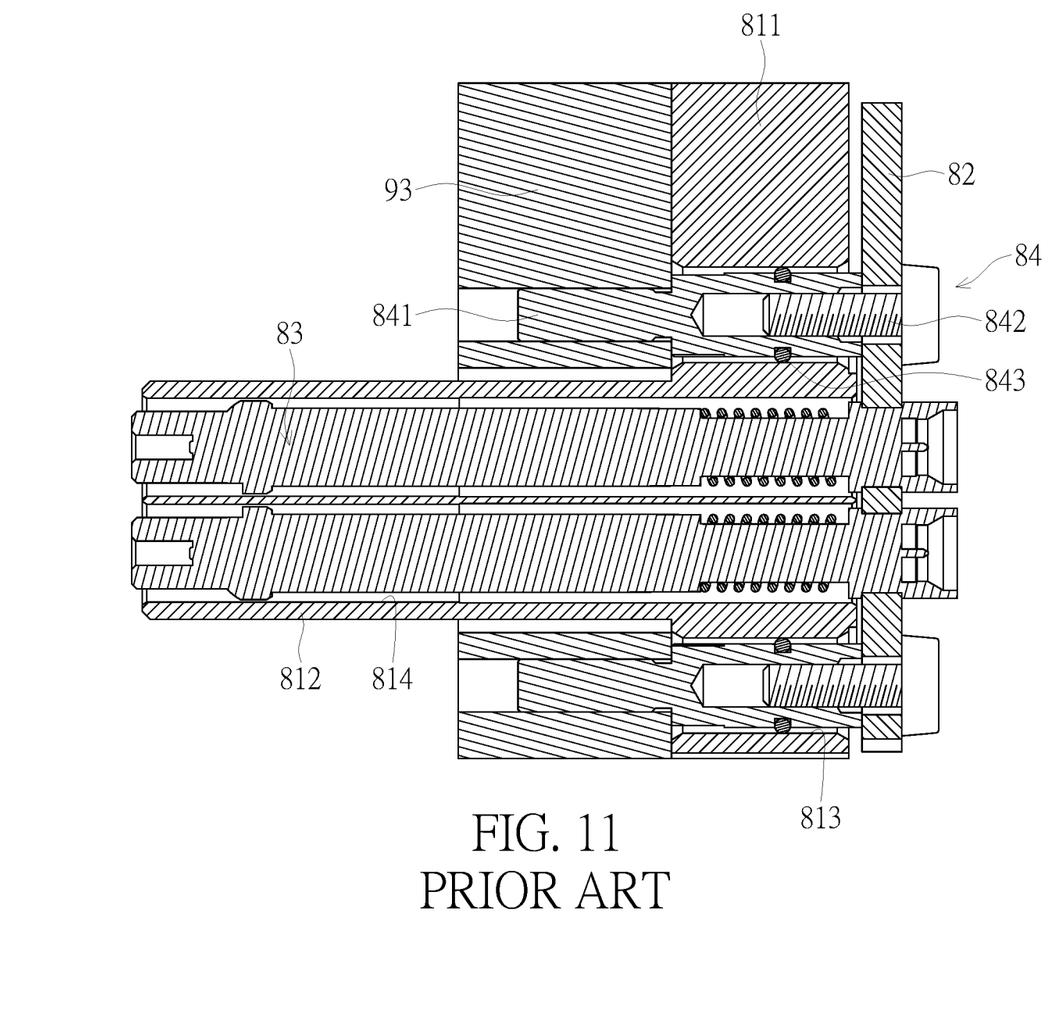
FIG. 11 is an operational cross-sectional side view of the conventional connector in FIG. 10, showing the conventional connector being locked in position with a front-locking way.
Figure 12:
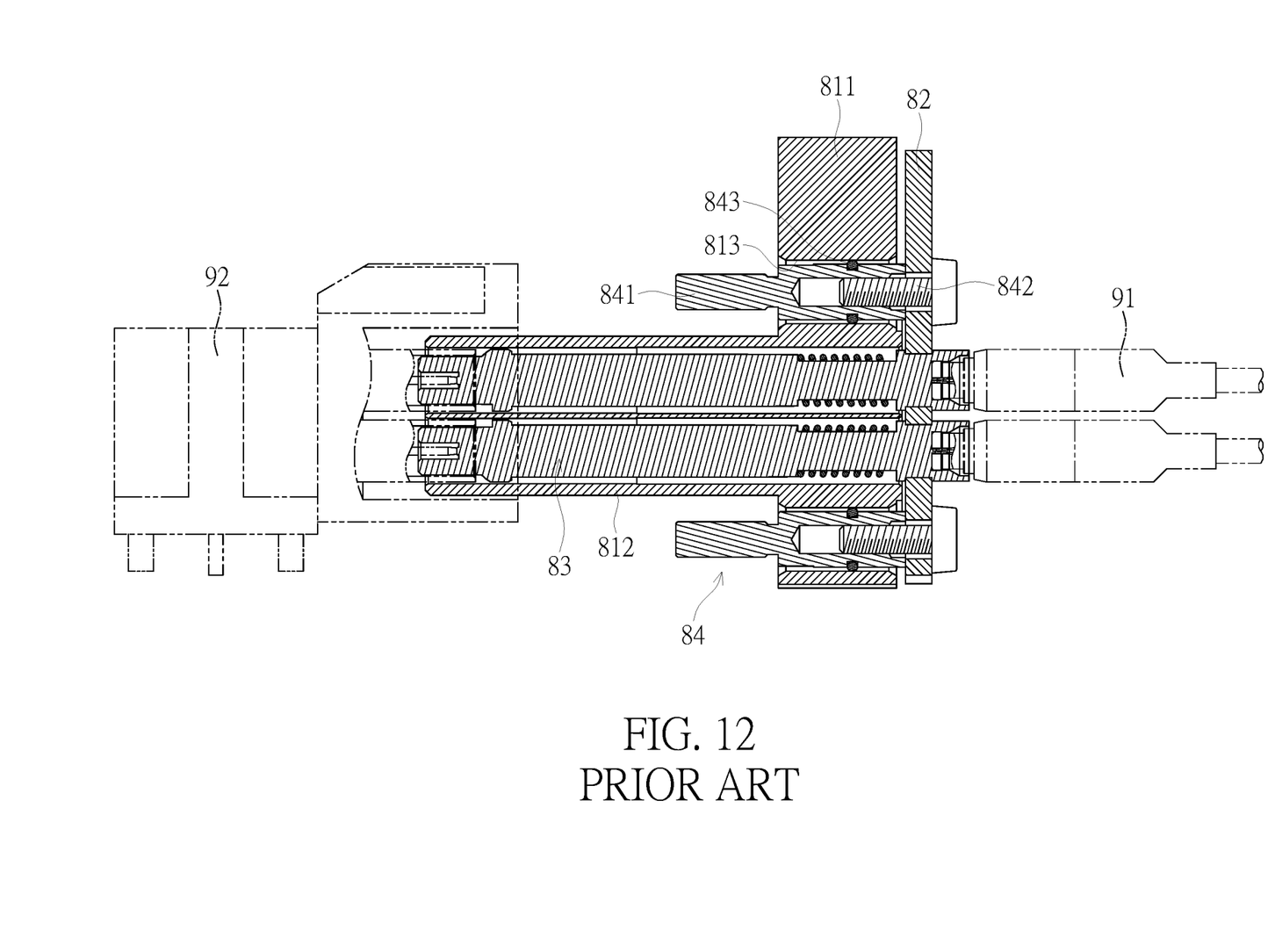
FIG. 12 is an operational cross-sectional side view of the conventional connector in FIG. 10.

With reference to FIGS. 10 to 12, a conventional connector for circuit testing is used to connect a circuit tester 91 and a product 92 to be tested, and comprises a stationary base 81, a fixing panel 82, four central pin modules 83, and two fastening assemblies 84.

The stationary base 81 has a base portion 811, an extended portion 812, two fastening holes 813, and four mounting channels 814. The extended portion 812 extends forwardly from a front surface of the base portion 811. The two fastening holes 813 are separately formed through the base portion 811, are disposed by two opposite sides of the extended portion 812. The four mounting channels 814 are formed through the extended portion 812 and the base portion 811.

A rear end of each of the central pin modules 83 is held on the fixing panel 82. The four central pin modules 83 are mounted in the four mounting channels 814 of the stationary base 81 respectively. The fixing panel 82 is disposed by a rear side of the stationary base 81.

The two fastening assemblies 84 are mounted in the two fastening holes 813 of the stationary base 81 respectively. Each of the fastening assemblies 84 includes a first screw 841 and a second screw 842. The first screw 841 has a first screw connection section and a connecting section. A threaded hole is formed in an end of the connecting section. The connecting section is mounted in a corresponding one of the fastening holes 813. At least one positioning ring 843 is mounted around an outer side surface of the connecting section. With the at least one positioning ring 843 being held between the connecting section and an inner sidewall defined around the corresponding fastening hole 813, the first screw 841 is stably mounted in the corresponding fastening hole 813. The second screw 842 has a second screw connection section and a head. The section screw connection section is detachably fastened in the threaded hole of the first screw 841.

As shown in FIG. 11, the conventional connector for the circuit testing is locked on a fixing jig 93 of the circuit tester 91 in a front-locking way. Specifically, in a first step, the first screw 841 of each of the fastening assemblies 84 is mounted to the stationary base 81 with the first screw connection section extending toward a front side of the stationary base 81. Then the first screw connection section is fastened to the fixing jig 93 to allow the front surface of the base portion 811 of the stationary base 81 to abut against the fixing jig 93. In a second step, the fixing panel 82 along with the central pin modules 83 is mounted to the stationary base 81 from the rear side of the stationary base 81, and then the second screw 842 is mounted through the fixing panel 82 and is fastened to the first screw 841, such that the assembly of the conventional connector for the circuit testing is completed.

With further reference to FIG. 12, afterwards the circuit tester 91 is connected to the rear ends of the central pin modules 83 from the rear side of the stationary base 81, and the product 92 to be tested is connected to front ends of the central pin modules 83 from the front side of the stationary base 81, so as to detect circuit signals of the product 92 to be tested. In the conventional connector for the circuit testing, with each of the first screws 841 being held in the base portion 811 of the stationary base 81 through the at least one position ring 843, the stationary base 81 can slant multi-directionally when being fastened on the fixing jig 93. Thus, when the stationary base 81 and the product 92 to be tested are connected, a center position of the stationary base 81 can be automatically corrected, so that the stationary base 81 and the product 92 to be tested can be connected stably and damage to the product 92 to be tested can be avoided.

Figure 13:
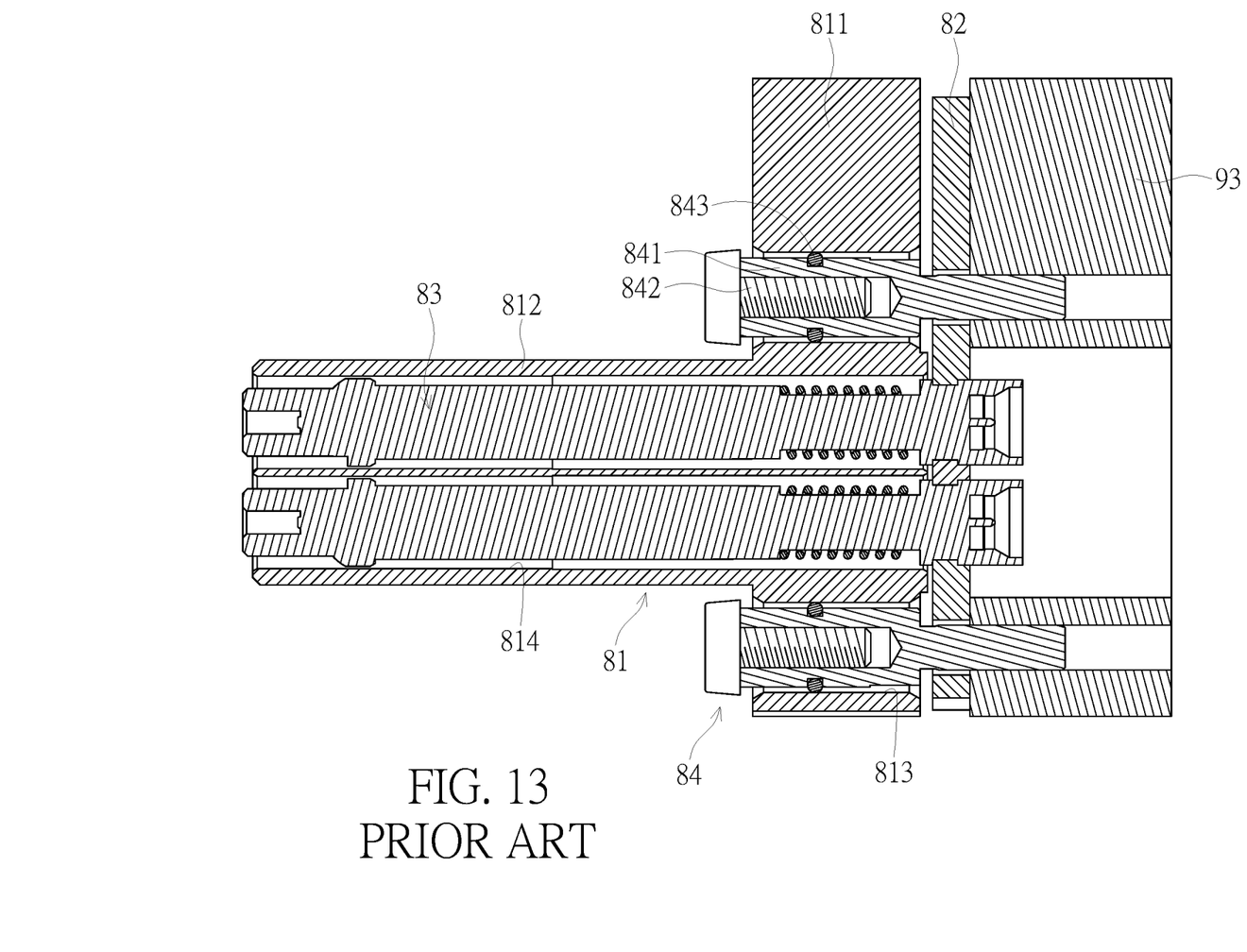
FIG. 13 is an operational cross-sectional side view of the conventional connector in FIG. 10, showing the conventional connector being locked in position with a rear-locking way.

In addition, with reference to FIG. 13, the conventional connector for the circuit testing may also be locked on the fixing jig 93 of the circuit tester 91 in a rear-locking way. Specifically, the first screw 841 of each of the fastening assemblies 84 is firstly is mounted to the stationary base 81 with the first screw connection section extending toward the rear side of the stationary base 81. Then the fixing panel 82 along with the central pin modules 83 is mounted to the stationary base 81 from the rear side of the stationary base 81, and the first screw connection section of the first screw 841 is mounted through the fixing panel 82 to extend further backward. Then the first screw connection section of each of the first screws 841 is fastened to the fixing jig 93, and the second screw 842 is fastened to the first screw 841 from the front surface of the base portion 811 of the stationary base 81.

However, as described above, the conventional connector for the circuit testing has to be locked to the fixing jig 93 through at least two steps, which is not only complicated but also time-consuming. Moreover, the positioning rings 843 that provide effect of automatically correcting the center position of the stationary base 81 are mounted on the first screws 841, and the positioning rings 843 would be worn when installing or removing the connector for the circuit testing by rotating the first screws 841. Consequently, displacement of the stationary base 81 when being connected with the product 92 to be tested and the effect of automatically correcting the center position of the stationary base 81 would be affected. Furthermore, when fastening the second screw 842 to a corresponding one of the first screw 841, special attention has to be paid to a locking torque of rotating the second screw 842. If the locking torque is too large, positions of the positioning rings 843 would change, which would also affect the displacement of the stationary base 81 when being connected with the product 92 to be tested.

To overcome the shortcomings, the present invention provides a connector for circuit testing to mitigate or obviate the aforementioned problems.

SUMMARY OF THE INVENTION

The main objective of the present invention is to provide a connector for circuit testing. The connector includes a mounting seat, an extending seat, a fixing panel, and at least one central pin module. The mounting seat has a connecting hole and multiple fixing holes. The extending seat has a front end portion, a rear end portion mounted in the connecting hole of the mounting seat, and at least one mounting channel. At least one positioning ring is mounted around the rear end portion of the extending seat and is held between the extending seat and an inner sidewall that is defined around the connecting hole. Each of the at least one central pin module has a rear end held on the fixing panel, and is mounted in a corresponding one of the at least one mounting channel of the extending seat. The fixing panel abuts against a rear side surface of the mounting seat and multiple first fasteners are mounted through the fixing panel and are fastened in the fixing holes of the mounting seat respectively.

A whole of the connector for the circuit testing can be locked to a fixing jig at once, which is simple and fast to assemble. Since the at least one positioning ring is held between the rear end portion of the extending seat and the mounting seat, the at least one positioning ring does not wear out as assembling the mounting seat onto the fixing jig, which could maintain a structural integrity of the at least one positioning ring. Accordingly, the extending seat is able to be stably connected with a product to be tested, and an effect of automatically correcting a center position of the extending seat can be ensured. In addition, when locking the mounting seat to the fixing jig with multiple second fasteners, there is no need to pay attention to a locking torque that drives the second fasteners to rotate as long as the second fasteners can be driven to rotate, which is simpler for operation.

When connecting the extending seat and the product to be tested, in addition to slant upward, downward, leftward or rightward to correct the center position of the extending seat automatically, the extending seat is also able to move forward or backward relative to the mounting seat. Thus, the extending seat is able to slant or move in more directions when the center position of the extending seat is automatically corrected, and an effect of avoiding damage to the product to be tested can be improved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
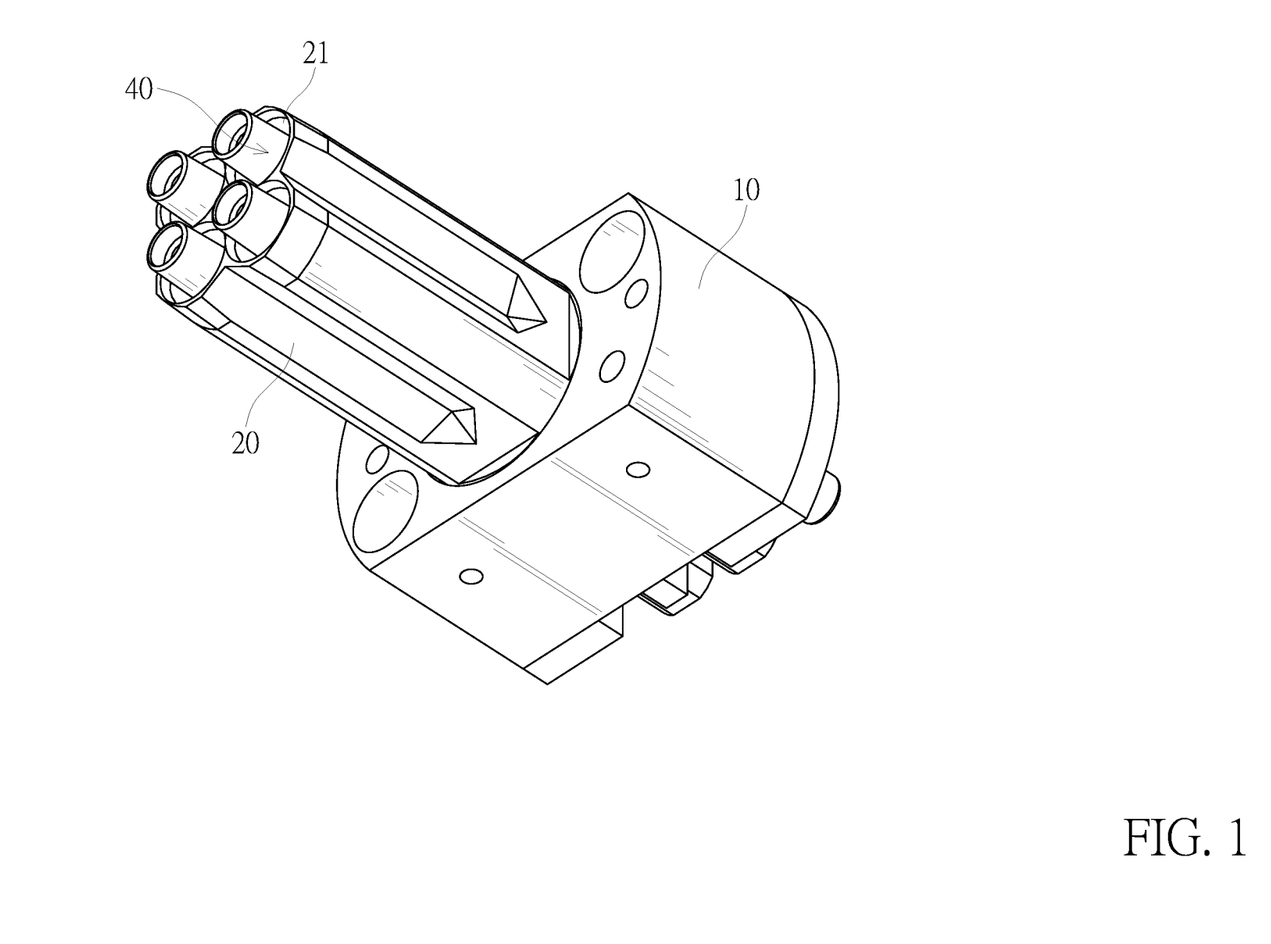
FIG. 1 is a perspective view of a first embodiment of a connector for circuit testing in accordance with the present invention.
Figure 2:
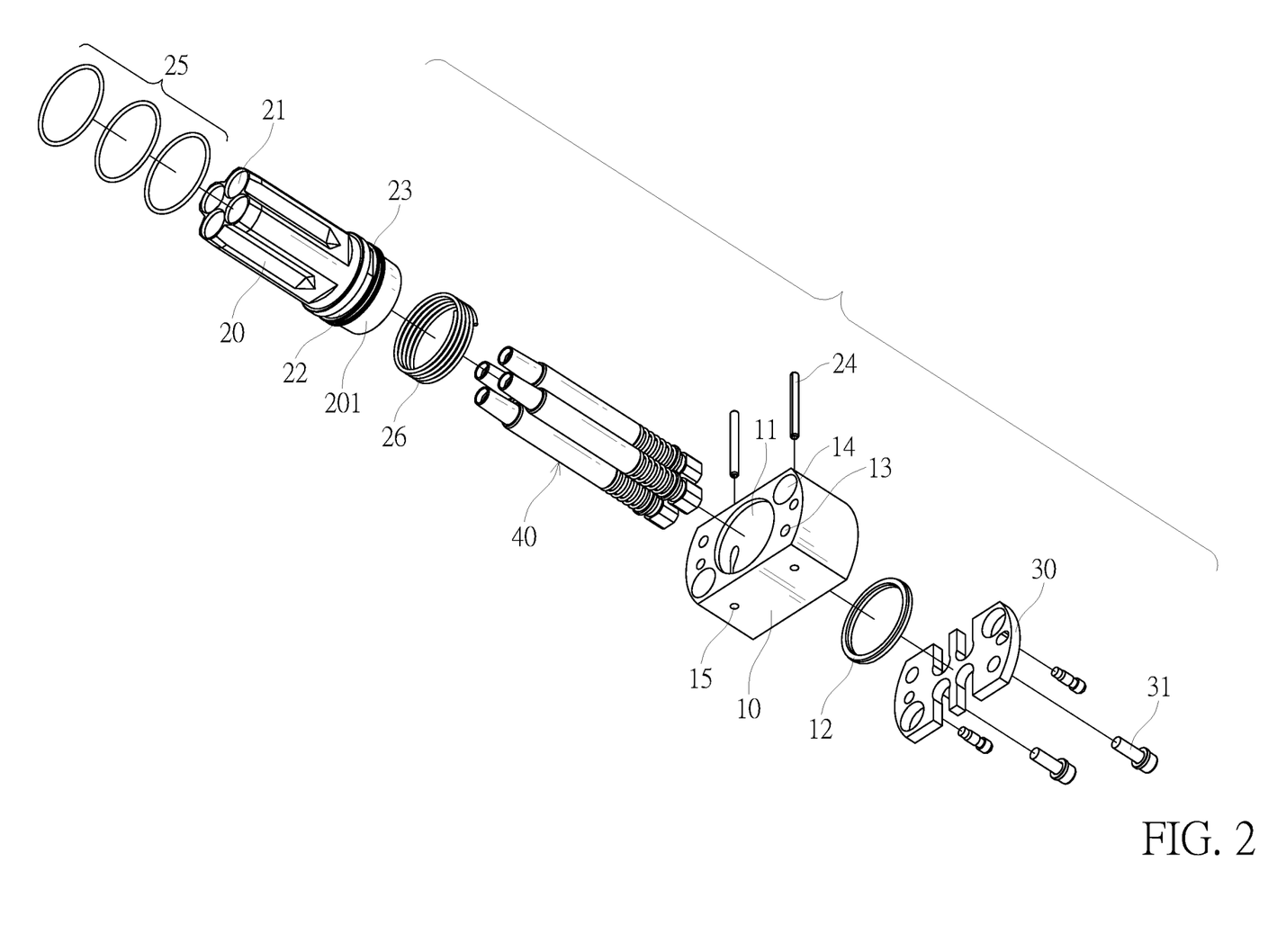
FIG. 2 is an exploded perspective view of the first embodiment of the connector in FIG. 1.
Figure 3:
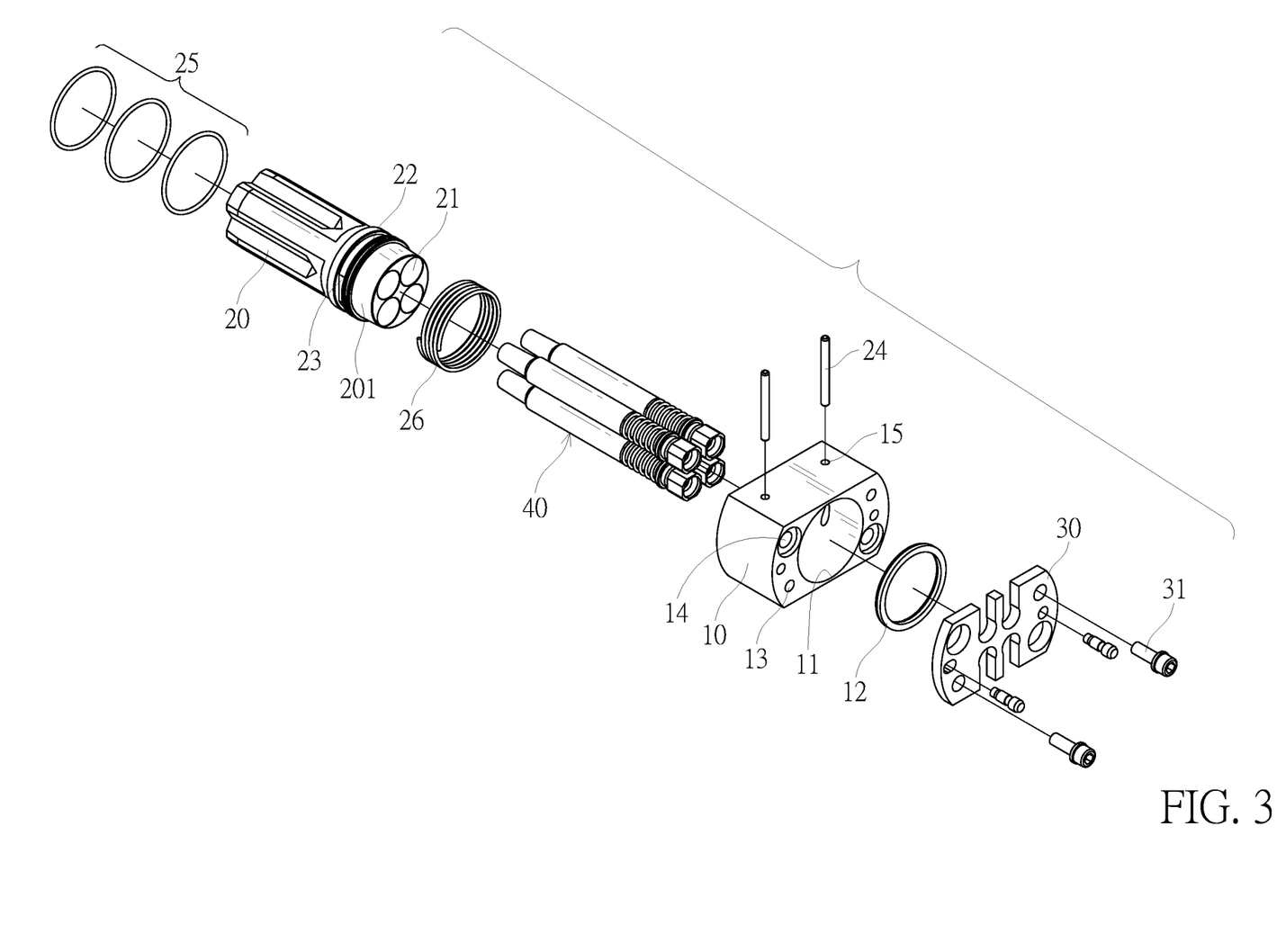
FIG. 3 is another exploded perspective view of the first embodiment of the connector in FIG. 1.

With reference to FIGS. 1 to 3, a connector for circuit testing comprises a mounting seat 10, an extending seat 20, a fixing panel 30, and at least one central pin module 40.

Figure 4:
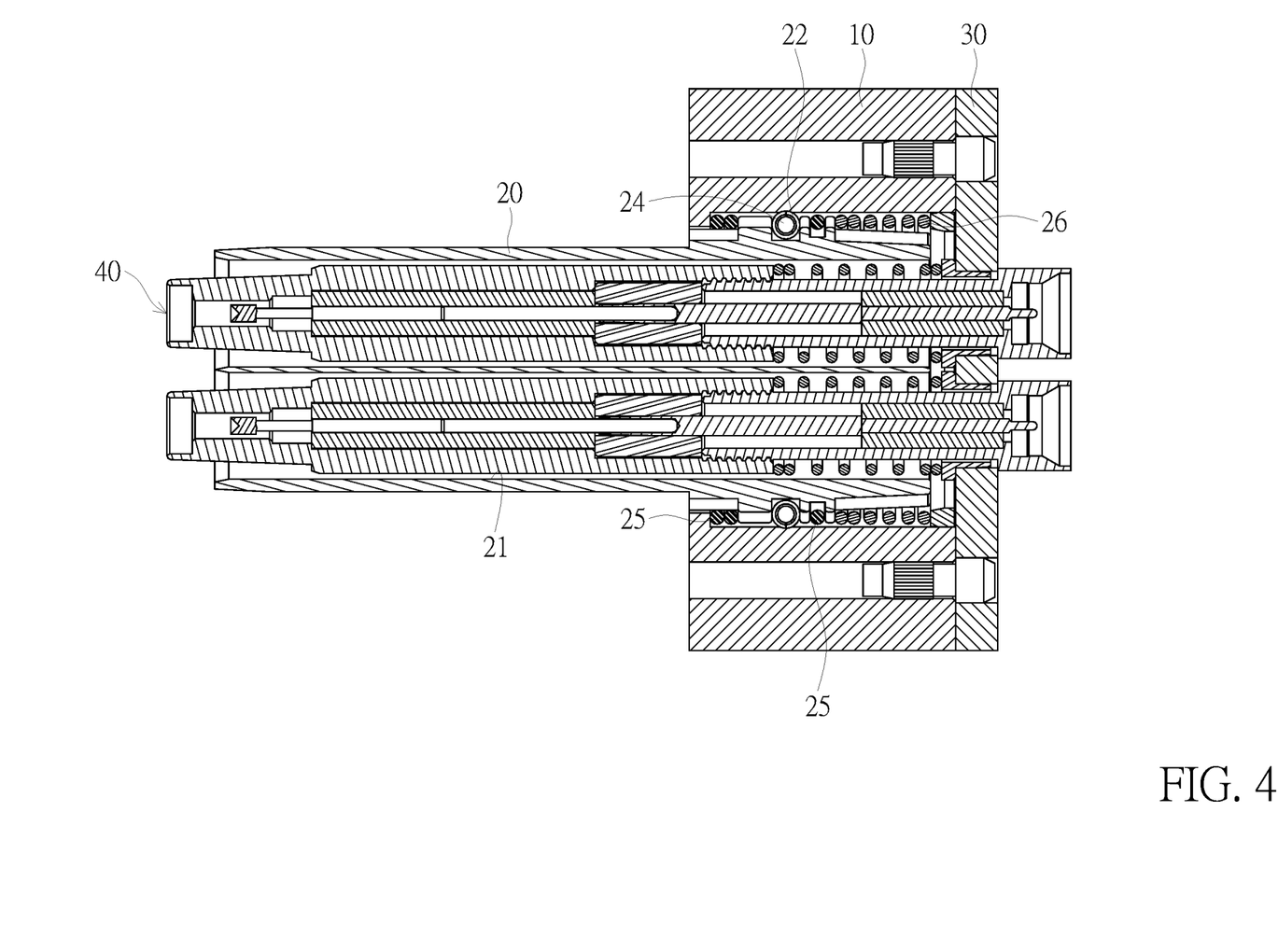
FIG. 4 is a cross-sectional side view of the first embodiment of the connector in FIG. 1.

With further reference to FIG. 4, the mounting seat 10 has a connecting hole 11, multiple fixing holes 13, multiple mounting holes 14, and two positioning holes 15. The connecting hole 11 is disposed in a center of the mounting seat 10, and extends between and is formed through a front side surface of the mounting seat 10 and a rear side surface of the mounting seat 10. An inner flange 12 is disposed on an inner sidewall, which is defined around the connecting hole 11 of the mounting seat 10, and adjacent to the rear side surface of the mounting seat 10. In the preferred embodiment, the inner flange 12 is an annular component securely mounted in the connecting hole 11. However, it is not limited thereto, and the inner flange 12 may also be formed in the connecting hole 11 with the inner flange 12 and the mounting seat 10 being integrally formed as a single part. The fixing holes 13 are separately disposed around the connecting hole 11. Each of the fixing holes 13 extends between and is formed through the front side surface of the mounting seat 10 and the rear side surface of the mounting seat 10. The mounting holes 14 are also separately disposed around the connecting hole 11. Each of the mounting holes 14 extends between and is formed through the front side surface of the mounting seat 10 and the rear side surface of the mounting seat 10. Each of the two positioning holes 15 extends between and is formed through an annular side surface of the mounting seat 10. The two positioning holes 15 are oppositely disposed beside the connecting hole 11 and communicate with the connecting hole 11.

The extending seat 20 is formed as an elongated seat and has a front end portion 202 and a rear end portion 201. The front end portion 202 and the rear end portion 201 are defined on two opposite ends of the extending seat 20 in a lengthwise direction of the extending seat 20 respectively. The rear end portion 201 is mounted in the connecting hole 11 of the mounting seat 10. The extending seat 20 has at least one mounting channel 21, an annular recess 22, and two flat surfaces 23. Each of the at least one mounting channel 21 extends between and is formed through the front end portion 202 and the rear end portion 201 of the extending seat 20. The annular recess 22 is formed in an outer annular surface that is defined around the rear end portion 201 of the extending seat 20. The two flat surfaces 23 are formed on a recess bottom, which is define in the annular recess 22, and are oppositely disposed on the rear end portion 201. The two flat surfaces 23 correspond in position to the two positioning holes 15 of the mounting seat 10 respectively.

Figure 8:
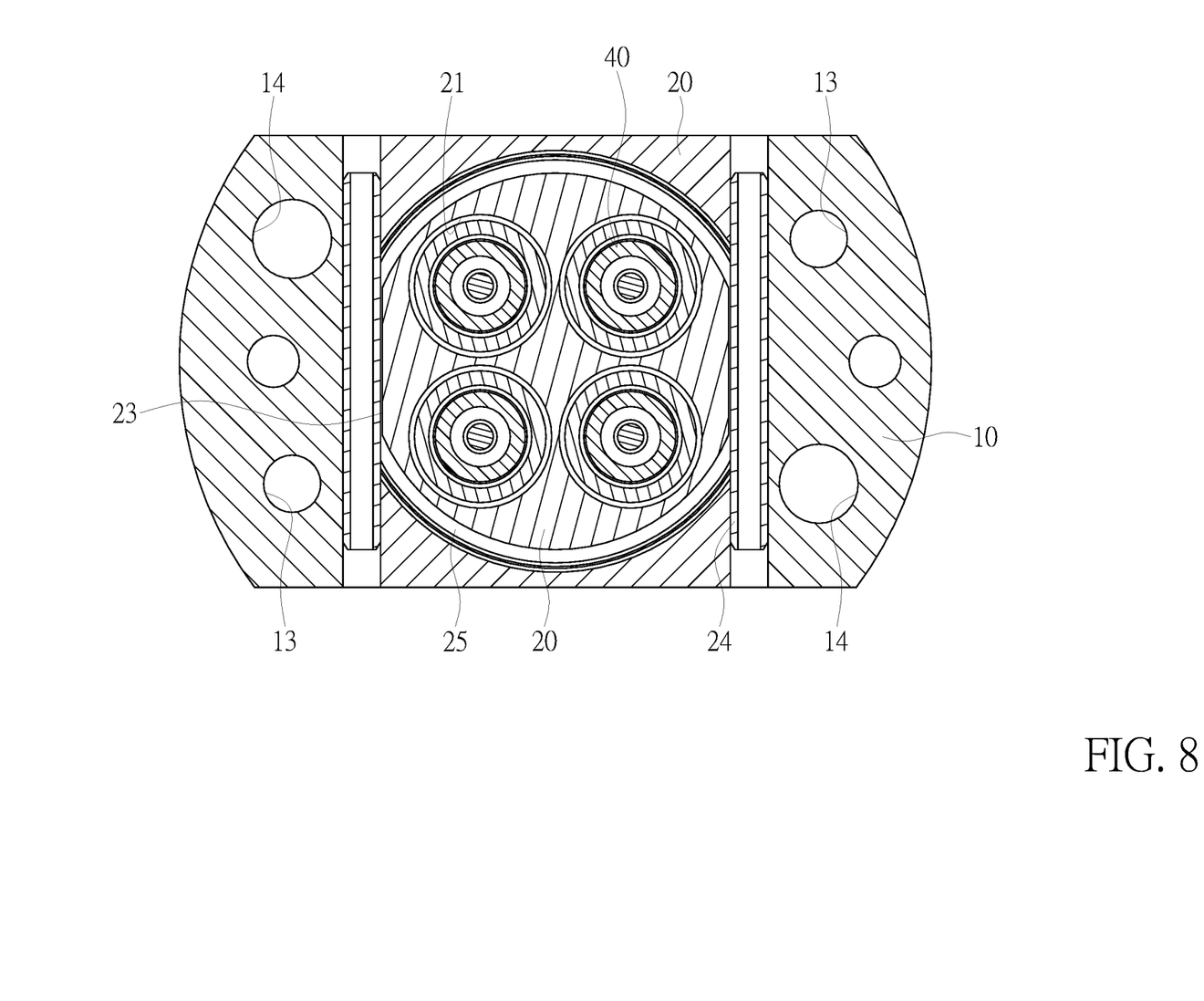
FIG. 8 is a cross-sectional end view of the first embodiment of the connector in FIG. 1.

With further reference to FIG. 8, two pins 24 are mounted in the two positioning holes 15 respectively, are mounted through the annular recess 22 on the rear end portion 201 of the extending seat 20, and abut against the two flat surfaces 23 respectively. The two pins 24 are able to limit a movement range of the extending seat 20 along the lengthwise direction of the extending seat 20, prevent the extending seat 20 from breaking away from the mounting seat 10, and prevent the extending seat 20 from rotating relative to the mounting seat 10.

Preferably, each of the pins 24 may be a spring pin, such as a slotted spring pin. The spring pin is compressed when being installed in a corresponding one of the positioning holes 15 of the mounting seat 10 and the annular recess 22 of the extending seat 20, and applies continuous pressure on the mounting seat 10 and the extending seat 20. Thus, the pins 24 do not fall off due to looseness or vibration.

At least one positioning ring 25 and a restoring resilient element 26 are mounted around the rear end portion 201. The at least one positioning ring 25 is held between the extending seat 20 and the inner sidewall that is defined around the connecting hole 11, so as to allow the extending seat 20 to be stably mounted in the connecting hole 11. The restoring resilient element 26 has two ends abutting against the inner flange 12 of the mounting seat 10 and the extending seat 20 respectively, such that the restoring resilient element 26 pushes the extending seat 20 to move toward a front side of the mounting seat 10.

In the preferred embodiment, the restoring resilient element 26 is, but is not limited to, a compression spring. The at least one positioning ring 25 includes multiple positioning rings 25 arranged at intervals. The annular recess 22 of the extending seat 20 and the pins 24 in the annular recess 22 are disposed between two of the positioning rings 25 that are disposed next to each other.

A rear end of each of the at least one central pin module 40 is held on the fixing panel 30. Each of the at least one central pin module 40 is mounted in a corresponding one of the at least one mounting channel 21 of the extending seat 20. The fixing panel 30 abuts against the rear side surface of the mounting seat 10. Multiple first fasteners 31 are mounted through the fixing panel 30 and are fastened in the fixing holes 13 of the mounting seat 10 respectively, so as to assemble the fixing panel 30 and the at least one central pin module 40 on the mounting seat 10.

Figure 6:
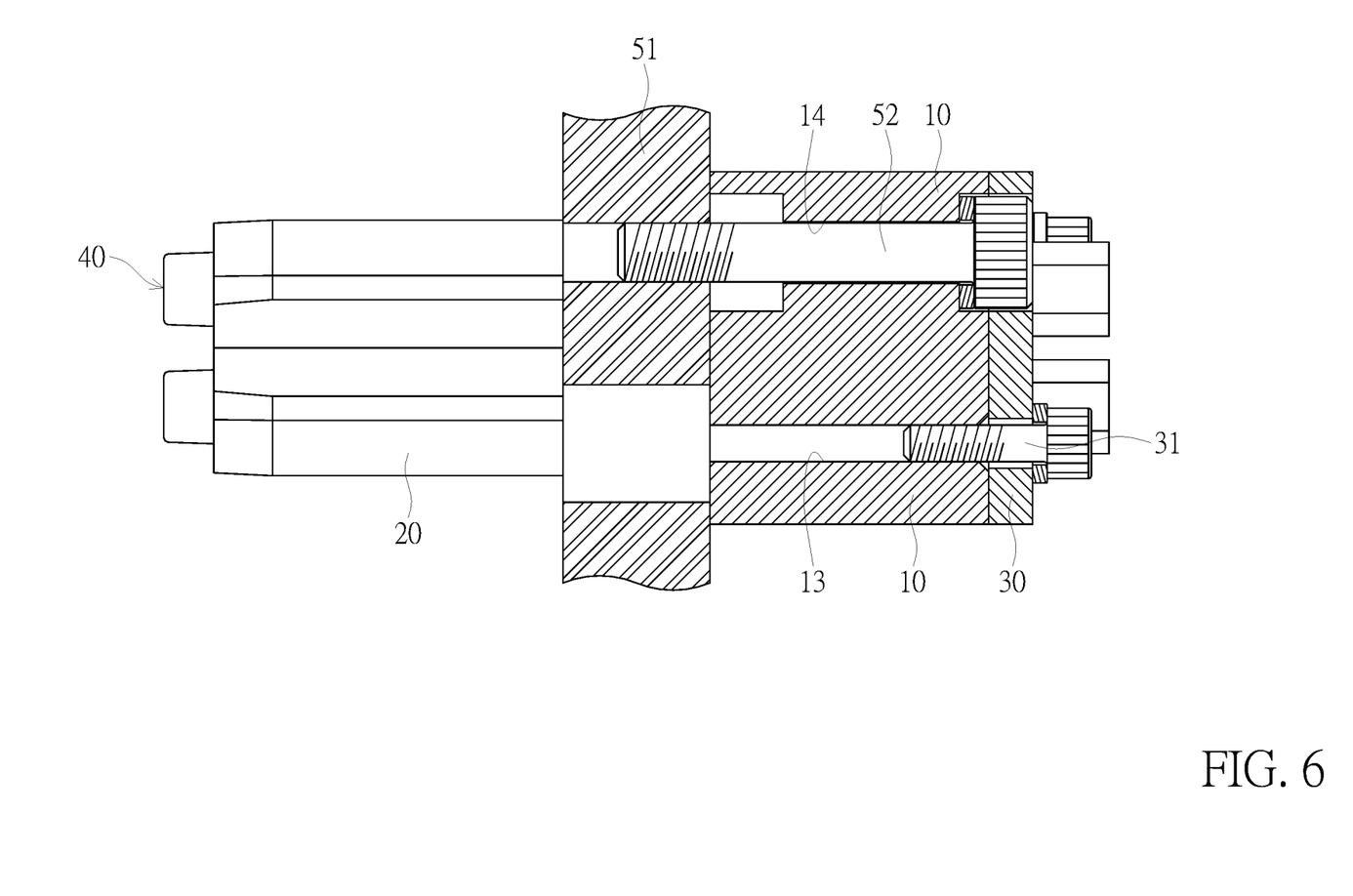
FIG. 6 is another operational cross-sectional side view of the first embodiment of the connector in FIG. 1, showing the connector being locked in position with a front-locking way.

With reference to FIG. 6, the connector for the circuit testing may be locked on a fixing jig 51 of a circuit tester in a front-locking way. Specifically, when assembling, first the extending seat 20 is mounted through the fixing jig 51 to allow the front side surface of the mounting seat 10 to abut against the fixing jig 51. Then multiple second fasteners 52 are mounted through the fixing panel 30 and the mounting holes 14 of the mounting seat 10 respectively from a back side of the connector and are fastened to the fixing jig 51.

Figure 7:
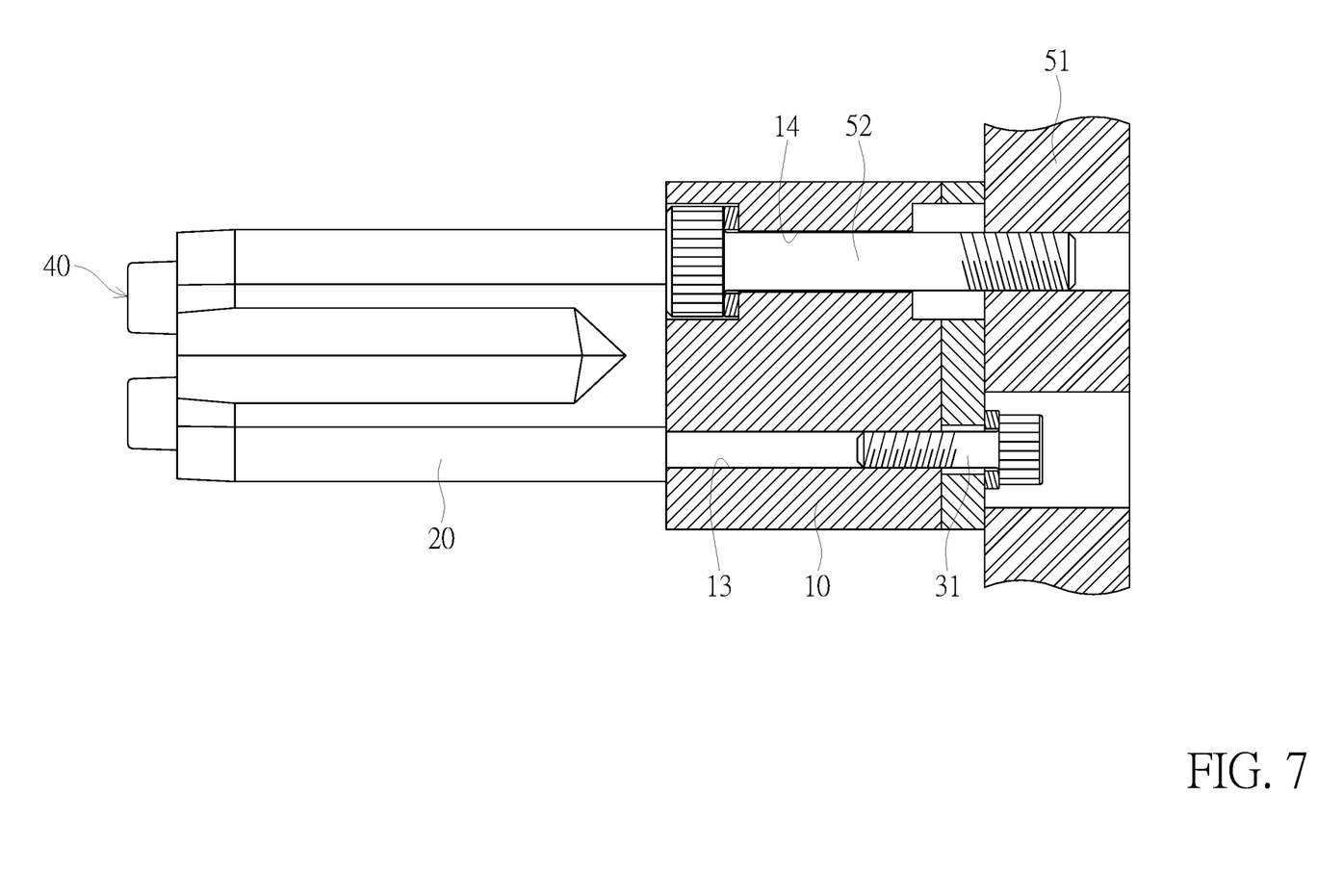
FIG. 7 is said another operational cross-sectional side view of the first embodiment of the connector in FIG. 1, showing the connector being locked in position with a rear-locking way.

With reference to FIG. 7, the connector for the circuit testing may be locked on the fixing jig 51 of the circuit tester in a rear-locking way. Specifically, when assembling, the fixing panel 30 on the back side of the connector abuts against the fixing jig 51, and the second fasteners 52 are mounted through the mounting holes 14 of the mounting seat 10 respectively and the fixing panel 30 from a front side of the connector and are fastened to the fixing jig 51.

Figure 5:
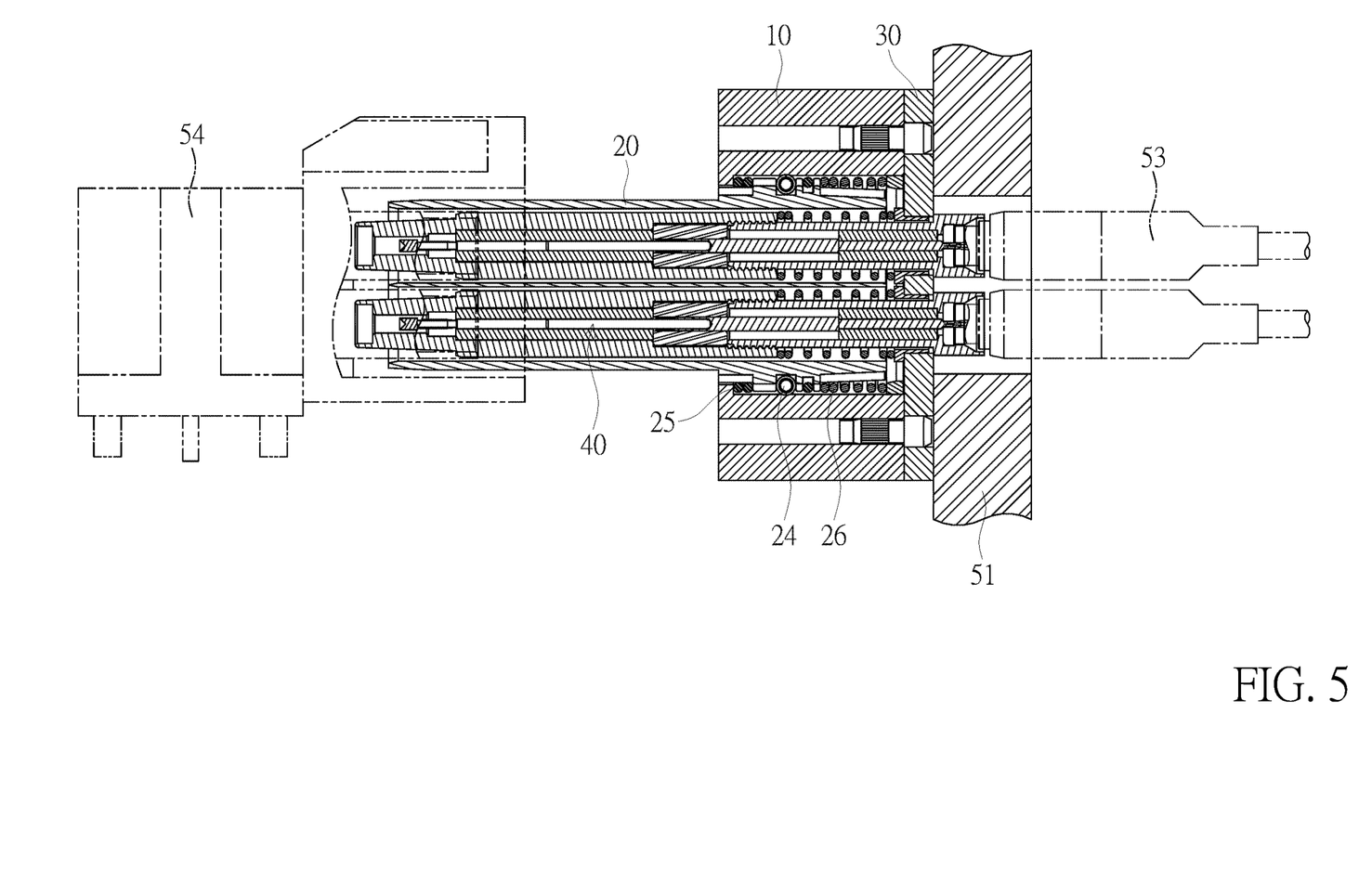
FIG. 5 is an operational cross-sectional side view of the first embodiment of the connector in FIG. 1.

With further reference to FIG. 5, the connector for the circuit testing is locked on the fixing jig 51 in the rear-locking way. A circuit tester 53 is connected to the rear end of the at least one central pin module 40 from the back side of the connector, and a product 54 to be tested is connected to a front end of the at least one central pin module 40 from the front side of the connector, such that circuit signals of the product 54 to be tested can be detected.

Figure 9:
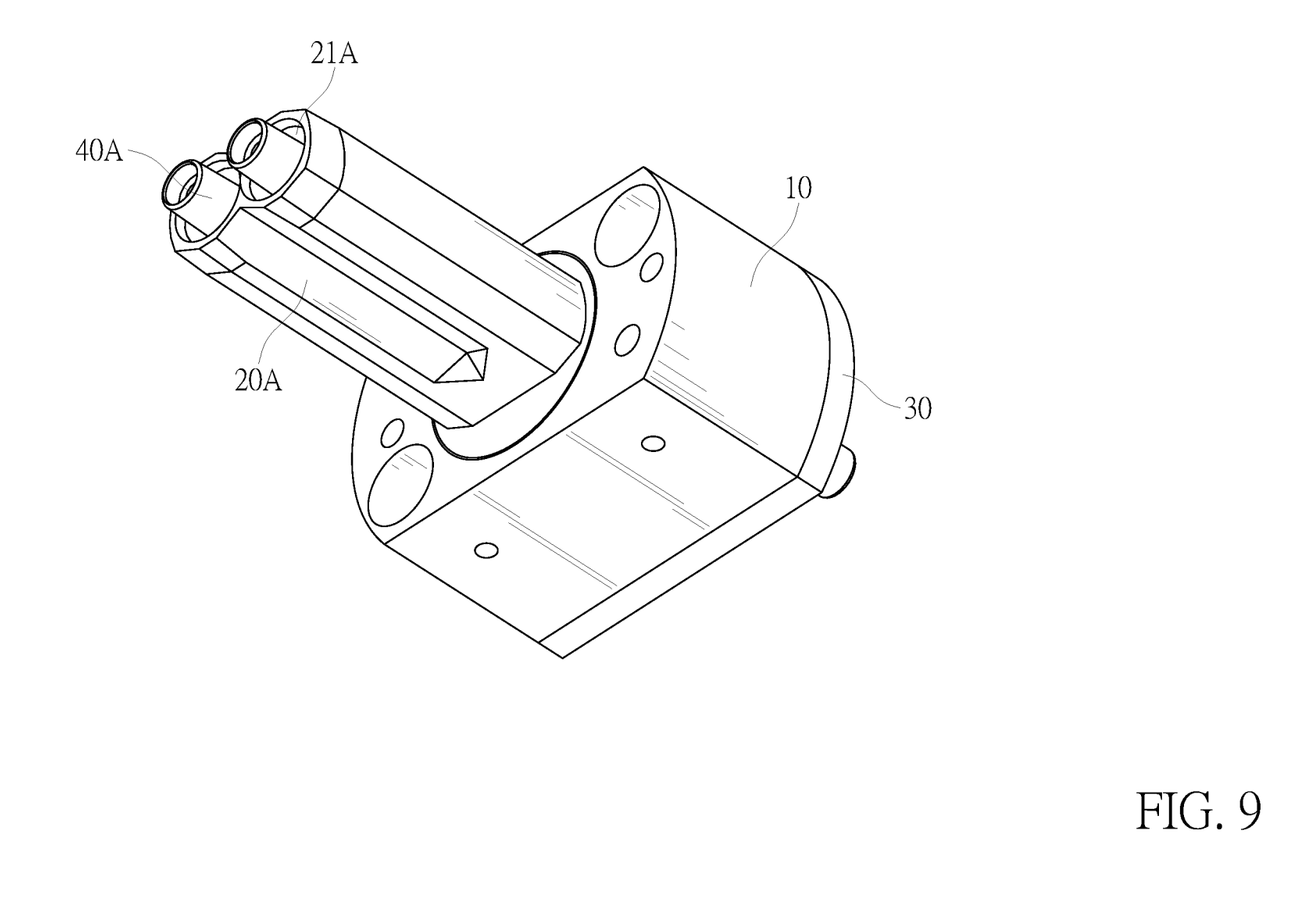
FIG. 9 is a perspective view of a second embodiment of a connector for circuit testing in accordance with the present invention.

As shown in FIGS. 1 and 2, in the preferred embodiment, the at least one central pin module 40 may include four central pin modules 40. Correspondingly, the at least one mounting channel 21 may include four mounting channels 21 for receiving the four central pin modules 40. With further reference to FIG. 9, in other preferred embodiment, the at least one central pin module 40A may include two central pin modules 40A and the at least one mounting channel 21A may include two mounting channels 21A. The number of the central pin module 40, 40A and the number of the mounting channel 20, 20A are not limited to the numbers as listed above and depend on usage requirement.

The connector for the circuit testing as described has the following advantages. In addition to provide waterproof effect, the at least one positioning ring 25 held between the rear end portion 201 of the extending seat 20 and the mounting seat 10 also allows the extending seat 20 to slant upward, downward, leftward or rightward when connecting to the product 54 to be tested. Accordingly, a center position of the extending seat 20 can be corrected automatically. Moreover, with the restoring resilient element 26 abutting between the mounting seat 10 and the extending seat 20, the extending seat is able to further move forward or backward relative to the mounting seat 10. Thus, the extending seat 20 is able to slant or move in more directions when the center position of the extending seat 20 is automatically corrected, and an effect of avoiding damage to the product 54 to be tested can be improved.

Furthermore, a whole of the connector for the circuit testing can be locked to the fixing jig 51 at once, which is simple and fast to assemble. Since the at least one positioning ring 25 is held between the rear end portion 201 of the extending seat 20 and the mounting seat 10, the at least one positioning ring 25 does not be moved as assembling the mounting seat 10 onto the fixing jig 51, which could prevent the at least one positioning ring 25 from being worn and maintain a structural integrity of the at least one positioning ring 25. Accordingly, the extending seat 20 is able to be stably connected with the product 54 to be tested, and an effect of automatically correcting the center position of the extending seat 20 can be ensured. In addition, when locking the mounting seat 10 to the fixing jig 51 with the second fasteners 52, there is no need to pay attention to a locking torque that drives the second fasteners 52 to rotate as long as the second fasteners 52 can be driven to rotate, which is simpler for operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A connector for circuit testing, and the connector comprising:
   a mounting seat having
      a connecting hole extending between and formed through a front side surface of the mounting seat and a rear side surface of the mounting seat; and
      multiple fixing holes, and each of the fixing holes extending between and formed through the front side surface of the mounting seat and the rear side surface of the mounting seat;
   an extending seat having a front end portion;

a rear end portion mounted in the connecting hole of the mounting seat; and at least one mounting channel, and each of the at least one mounting channel extending between and formed through the front end portion and the rear end portion of the extending seat, wherein at least one positioning ring is mounted around the rear end portion of the extending seat and is held between the extending seat and an inner sidewall that is defined around the connecting hole;

a fixing panel; and at least one central pin module, each of the at least one central pin module having a rear end held on the fixing panel, and each of the at least one central pin module mounted in a corresponding one of the at least one mounting channel of the extending seat, wherein the fixing panel abuts against the rear side surface of the mounting seat and multiple first fasteners are mounted through the fixing panel and are fastened in the fixing holes of the mounting seat respectively.

2. The connector as claimed in claim 1, wherein a restoring resilient element is mounted around the rear end portion of the extending seat and has two ends abutting against the mounting seat and the extending seat respectively to push the extending seat to move toward a front side of the mounting seat.

3. The connector as claimed in claim 2, wherein an inner flange is disposed on an inner sidewall, which is defined around the connecting hole of the mounting seat, and adjacent to the rear side surface of the mounting seat; and the two ends of the restoring resilient element abut against the inner flange of the mounting seat and the extending seat respectively.

4. The connector as claimed in claim 1, wherein the mounting seat has two positioning holes, each of the two positioning holes extends between and is formed through an annular side surface of the mounting seat, and thee two positioning holes are oppositely disposed beside the connecting hole and communicate with the connecting hole;

the extending seat has an annular recess formed in an outer annular surface that is defined around the rear end portion of the extending seat; and two flat surfaces formed on a recess bottom, which is define in the annular recess, oppositely disposed on the rear end portion, and correspond in position to the two positioning holes of the mounting seat respectively; and two pins are mounted in the two positioning holes respectively, are mounted through the annular recess on the rear end portion of the extending seat, and abut against the two flat surfaces respectively.

5. The connector as claimed in claim 2, wherein the mounting seat has two positioning holes, each of the two positioning holes extends between and is formed through an annular side surface of the mounting seat, and thee two positioning holes are oppositely disposed beside the connecting hole and communicate with the connecting hole;

the extending seat has an annular recess formed in an outer annular surface that is defined around the rear end portion of the extending seat; and two flat surfaces formed on a recess bottom, which is define in the annular recess, oppositely disposed on the rear end portion, and correspond in position to the two positioning holes of the mounting seat respectively; and two pins are mounted in the two positioning holes respectively, are mounted through the annular recess on the rear end portion of the extending seat, and abut against the two flat surfaces respectively.

6. The connector as claimed in claim 3, wherein the mounting seat has two positioning holes, each of the two positioning holes extends between and is formed through an annular side surface of the mounting seat, and thee two positioning holes are oppositely disposed beside the connecting hole and communicate with the connecting hole;

the extending seat has an annular recess formed in an outer annular surface that is defined around the rear end portion of the extending seat; and two flat surfaces formed on a recess bottom, which is define in the annular recess, oppositely disposed on the rear end portion, and correspond in position to the two positioning holes of the mounting seat respectively; and two pins are mounted in the two positioning holes respectively, are mounted through the annular recess on the rear end portion of the extending seat, and abut against the two flat surfaces respectively.

7. The connector as claimed in claim 4, wherein each of the pins is a spring pin.

8. The connector as claimed in claim 5, wherein each of the pins is a spring pin.

9. The connector as claimed in claim 6, wherein each of the pins is a spring pin.

10. The connector as claimed in claim 7, wherein the at least one positioning ring includes multiple positioning rings arranged at intervals; and the annular recess of the extending seat and the pins in the annular recess are disposed between two of the positioning rings that are disposed next to each other.

11. The connector as claimed in claim 8, wherein the at least one positioning ring includes multiple positioning rings arranged at intervals; and the annular recess of the extending seat and the pins in the annular recess are disposed between two of the positioning rings that are disposed next to each other.

12. The connector as claimed in claim 9, wherein the at least one positioning ring includes multiple positioning rings arranged at intervals; and the annular recess of the extending seat and the pins in the annular recess are disposed between two of the positioning rings that are disposed next to each other.

* * * * *